(12) United States Patent
Aoshima

(10) Patent No.: US 7,173,352 B2
(45) Date of Patent: Feb. 6, 2007

(54) STEPPING MOTOR

(75) Inventor: Chikara Aoshima, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 11/080,416

(22) Filed: Mar. 16, 2005

(65) Prior Publication Data

US 2005/0231046 A1    Oct. 20, 2005

(30) Foreign Application Priority Data

Apr. 14, 2004    (JP) ............... 2004-118996

(51) Int. Cl.
*H02K 37/12* (2006.01)
*H02K 37/14* (2006.01)

(52) U.S. Cl. .................. 310/49 R; 310/49 A

(58) Field of Classification Search ............. 310/49 R, 310/49 A, 156.02, 156.08–156.09, 156.12–156.15, 310/156.38–156.46
See application file for complete search history.

(56) References Cited

U.S. PATENT DOCUMENTS

| | | | |
|---|---|---|---|
| 4,504,755 A * | 3/1985 | Semones et al. ....... | 310/156.47 |
| 4,626,719 A * | 12/1986 | Foster ................ | 310/49 R |
| 5,384,506 A | 1/1995 | Aoshima ............... | 310/49 R |
| 5,831,356 A | 11/1998 | Aoshima ............... | 310/49 R |
| 5,925,945 A | 7/1999 | Aoshima ............... | 310/49 R |
| 5,945,753 A | 8/1999 | Maegawa et al. ....... | 310/68 B |
| 5,969,453 A | 10/1999 | Aoshima .............. | 310/156 |
| 5,973,425 A | 10/1999 | Aoshima .............. | 310/49 R |
| 6,046,517 A | 4/2000 | Sasaki et al. ........ | 310/40 MM |
| 6,081,053 A | 6/2000 | Maegawa et al. ....... | 310/49 R |
| 6,157,107 A | 12/2000 | Aoshima et al. ....... | 310/156 |
| 6,172,440 B1 * | 1/2001 | Sasaki et al. ........ | 310/156.02 |
| 6,255,749 B1 | 7/2001 | Aoshima et al. ....... | 310/49 R |
| 6,316,851 B1 | 11/2001 | Maegawa et al. ....... | 310/49 R |
| 6,400,055 B1 | 6/2002 | Aoshima et al. ....... | 310/156.01 |
| 6,411,003 B1 * | 6/2002 | Sasaki et al. ........ | 310/156.02 |
| 6,465,916 B1 | 10/2002 | Aoshima ............. | 310/49 R |
| 6,559,569 B2 | 5/2003 | Aoshima ............. | 310/112 |
| 6,713,985 B2 | 3/2004 | Aoshima ............. | 318/696 |
| 6,787,956 B2 * | 9/2004 | Sun .................. | 310/90.5 |

(Continued)

FOREIGN PATENT DOCUMENTS

JP    9-331666    12/1997

(Continued)

*Primary Examiner*—Tran N. Nguyen
(74) *Attorney, Agent, or Firm*—Fitzpatrick, Cella, Harper & Scinto

(57) ABSTRACT

A stepping motor includes a magnet ring 1 whose outer peripheral surface is circumferentially divided to form radial protrusions and recesses and whose outer peripheral surface consists of a cylindrical permanent magnet magnetized to the same polarity, first and second cylindrical coils 2 and 3, a first outer magnetic pole portion 8 excited by the first coil, a second outer magnetic pole portion 9 excited by the second coil, and an output shaft 10 formed of a soft magnetic material and fixed to the inner peripheral portion of the magnet ring, the output shaft 10 being opposed to at least one of the first outer magnetic pole portion and the second outer magnetic pole portion in a predetermined axial range and equipped with an inner magnetic pole portion excited by at least one of the first coil and the second coil. Accordingly, a low-cost, high output, and high resolution stepping motor can be provided without hindering miniaturization.

3 Claims, 8 Drawing Sheets

U.S. PATENT DOCUMENTS

| | | | |
|---|---|---|---|
| 6,844,643 B2 | 1/2005 | Aoshima | 310/112 |
| 6,897,579 B2 | 5/2005 | Aoshima | 310/49 R |
| 6,979,918 B2 * | 12/2005 | Aoshima et al. | 310/49 A |
| 2004/0124719 A1 | 7/2004 | Aoshima et al. | 310/49 R |

FOREIGN PATENT DOCUMENTS

| | | |
|---|---|---|
| JP | 10-229670 | 8/1998 |

* cited by examiner

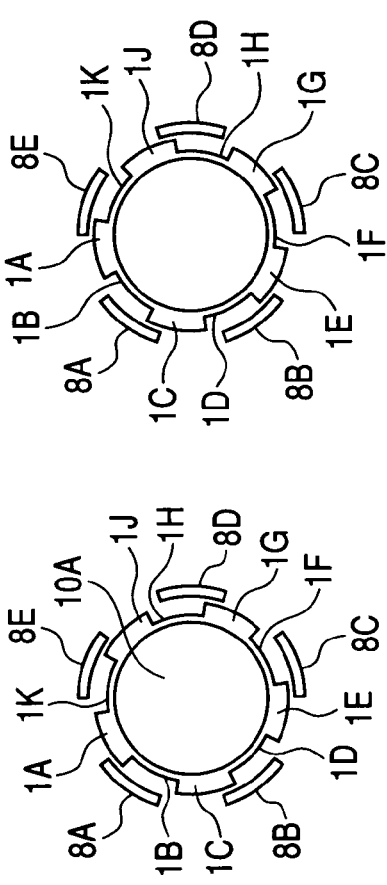

STEPPING MOTOR

BACKGROUND OF THE INVENTION

1. Field of the Invention

The present invention relates to a stepping motor of a cylindrical configuration applicable to a small apparatus, such as a photographing apparatus or a mobile phone.

2. Related Background Art

A stepping motor having a reduced diameter about an output shaft and an enhanced output level has been proposed (refer to Japanese Patent Application Laid-Open No. H09-331666 (U.S. Pat. No. 5,831,356)). FIG. 10 shows an exploded perspective view of the stepping motor. FIG. 11 shows a sectional view of an assembled stepping motor taken along its axis.

FIGS. 10 and 11 show a rotor 201 having a cylindrical shape which is formed of permanent magnet divided into four parts in a peripheral direction so as to alternately magnetize the parts into different polarities, a first coil 202 arranged adjacently to the rotor 201 in an axial direction, a second coil 203 similarly arranged adjacently to the rotor 201 in the axial direction, a first stator 204 that is formed of a soft magnetic material and excited by the first coil 202, and a second stator 205 that is formed of a soft magnetic material and excited by the second coil 203. The first stator 204 includes first outer magnetic pole portions 204A and 204B that are opposed to an outer peripheral surface of the rotor 201 so as to have a clearance therebetween and first inner magnetic pole portions 204C and 204D that are opposed to an inner peripheral surface of the rotor 201 so as to have a clearance therebetween. The second stator 205 includes second outer magnetic pole portions 205A and 205B that are opposed to the outer peripheral surface of the rotor 201 so as to have a clearance therebetween and second inner magnetic pole portions 205C and 205D that are opposed to the inner peripheral surface of the rotor 201 so as to have a clearance therebetween.

The rotor 201 is fixed to an output shaft 206. The output shaft 206 is rotatably supported by a bearing portion 204E of the first stator 204 and a bearing portion 205E of the second stator 205. The first stator 204 and the second stator 205 are held by a coupling ring 207 formed of a non-magnetic material so as to have a predetermined clearance between the two stators.

With the stepping motor of the above arrangement, a current flowing through the first coil 202 is reversed in direction to switch the polarities of the first outer magnetic pole portions 204A and 204B and the polarities of the first inner magnetic pole portions 204C and 204D, and a current flowing through the second coil 203 is similarly reversed in direction to switch the polarities of the second outer magnetic pole portions 205A and 205B and the polarities of the second inner magnetic pole portions 205C and 205D. The rotor 201 is thus rotated.

In the stepping motor of this type, magnetic flux lines generated by energization of the coil pass from the outer magnetic pole portion to the inner magnetic pole portion opposed thereto or from the inner magnetic pole portion to the outer magnetic pole portion opposed thereto, thereby acting efficiently on each magnet composing the rotor arranged between the outer magnetic pole portion and the inner magnetic pole portion. Further, a distance between the outer magnetic pole portion and the inner magnetic pole portion that are opposed to each other can be set as being approximately as large as the thickness of the magnet having a cylindrical shape, thereby making it possible to reduce the resistance of a magnetic circuit formed by the outer magnetic pole portion and the inner magnetic pole portion. As the resistance of the magnetic circuit becomes smaller, more magnetic flux lines can be generated with a smaller amount of current, resulting in the enhanced output level.

Alternatively, an improved structure of the above stepping motor has been disclosed (refer to Japanese Patent Application Laid-Open No. H10-229670). In the structure, an inner magnetic pole portion is formed into a cylindrical shape, an output shaft (rotor shaft) inserted into an inner portion of the inner magnetic pole portion is formed of a soft magnetic material and attached to a stator (composed of the inner magnetic pole portion and the outer magnetic pole portion), and a bearing that rotatably supports the output shaft is formed of a soft magnetic material. According to the proposed structure, the output shaft is also included in a magnetic circuit, enhancing the output of the motor.

However, the motor disclosed in Japanese Patent Application Laid-Open No. H10-229670 has a problem in that magnetic flux lines generated by energization of a first coil adversely affects a second coil, a second outer magnetic pole portion, and a second inner magnetic pole portion via the output shaft formed of a soft magnetic material, and magnetic flux lines generated by energization of a second coil adversely affects a first coil, a first outer magnetic pole portion, and a first inner magnetic pole portion via the output shaft formed of a soft magnetic material, resulting in unstable rotation.

The motors disclosed in Japanese Patent Application Laid-Open No. H09-331666 (U.S. Pat. No. 5,831,356) and Japanese Patent Application Laid-Open No. H10-229670 both require a predetermined clearance between the inner periphery of the magnet and the inner magnetic pole portion opposed thereto, and management of the clearance during manufacture causes an increase in manufacturing cost. Further, the stator needs to include the inner magnetic pole portion and the outer magnetic pole portion that are formed into the cylindrical shape, and it is difficult to integrally structure those portions from the viewpoint of parts manufacturing. Further, in the case where those portions are separately manufactured and then integrally assembled, the number of necessary parts becomes large, causing an increase in manufacturing cost.

Further, recently, there is a particular demand for highly accurate indexing. To achieve this, it is necessary to enhance the resolution of the motor, and to make the magnetization separation pitch of the magnet finer, increasing the number of magnetization poles. However, due to the manufacturing factors of the magnetized yoke and from the viewpoint of formation of a strong magnetic field for magnetization, it is rather difficult to increase the number of magnetization poles of a magnet; usually, magnetization is effected at a pitch of approximately 1 mm. Thus, there is a demand for a magnet which is easy to manufacture, which has a strong magnetic force, and which exhibits a minute magnetization pitch.

SUMMARY OF THE INVENTION

It is a first object of the present invention to provide a stepping motor which is inexpensive and which is of high output and high resolution without hindering a reduction in size.

It is a second object of the present invention to provide a stepping moor capable of eliminating unstable rotation.

It is a third object of the present invention to provide a stepping motor which facilitates magnetization and production and which helps to achieve a further reduction in cost.

To attain the first object of the present invention, according to Embodiments 1 through 3 of the present invention, there is provided a stepping motor including: a magnet ring whose outer peripheral surface is circumferentially divided to form radial protrusions and recesses and whose outer peripheral surface is made of a cylindrical permanent magnet magnetized to the same polarity; a first cylindrical coil and a second cylindrical coil that are concentric with the magnet ring and arranged so as to hold the magnet ring therebetween with respect to an axial direction; a first outer magnetic pole portion opposed to one outer peripheral surface side of the magnet ring with a predetermined distance therebetween and excited by the first coil; a second outer magnetic pole portion opposed to the other outer peripheral surface side of the magnet ring with a predetermined distance therebetween and excited by the second coil; and an output shaft formed of a soft magnetic material and fixed to an inner peripheral portion of the magnet ring, the output shaft being opposed to at least one of the first outer magnetic pole portion and the second outer magnetic pole portion in a predetermined axial range and equipped with an inner magnetic pole portion excited by at least one of the first coil and the second coil.

To attain the second object of the present invention, according to Embodiments 1 through 3 of the present invention, there is provided a stepping motor including: a magnet ring whose outer peripheral surface is circumferentially divided to form radial protrusions and recesses and whose outer peripheral surface is made of a cylindrical permanent magnet magnetized to the same polarity; a first cylindrical coil and a second cylindrical coil that are concentric with the magnet ring and arranged so as to hold the magnet ring therebetween with respect to an axial direction; a first outer magnetic pole portion that is opposed to one outer peripheral surface extending from one end surface of the magnet ring and is excited by the first coil; a second outer magnetic pole portion that is opposed to the other outer peripheral surface extending from the other end of the magnet ring and is excited by the second coil; and an output shaft formed of a soft magnetic material, fixed to an inner peripheral portion of the magnet ring, the output shaft being opposed to the first outer magnetic pole portion in a predetermined axial range and opposed to the first inner magnetic pole portion and the second outer magnetic pole portion in a predetermined axial range, the output shaft being equipped with a second inner magnetic pole portion excited by the second coil, in which a connecting portion with an outer diameter D2 is provided between the first inner magnetic pole portion and the second inner magnetic pole portion with an outer diameter D1 such that D1>D2.

Further, to attain the third object of the present invention, according to Embodiment 3 of the present invention, it is preferable that, in stepping motor, the magnet ring be formed of a sheet-like flexible material whose one side has protrusions and recesses, and be wound around and fixed to an outer peripheral surface of the inner magnetic pole portion formed on the output shaft such that the outer peripheral surface has protrusions and recesses to form a cylindrical configuration, and that winding-start and winding-end portions of the sheet-like flexible material with respect to the outer peripheral surface of the inner magnetic pole portion be recessed portions.

To attain the first object of the present invention, according to Embodiment 4 of the present invention, there is provided a stepping motor including: an output shaft having a cylindrical portion and formed of a soft magnetic material; a permanent magnet formed of a sheet-like flexible material wound around the cylindrical portion of the output shaft and divided in a circumferential direction of the cylindrical portion and alternately magnetized to different polarities; a first cylindrical coil and a second cylindrical coil that are concentric with the cylindrical portion of the output shaft and arranged so as to axially hold therebetween the cylindrical portion around which the sheet-like permanent magnet is wound; a first outer magnetic pole portion opposed to one outer peripheral surface side of the sheet-like permanent magnet wound around an outer peripheral portion of the cylindrical portion of the output shaft with a predetermined distance therebetween and excited by the first coil; and a second outer magnetic pole portion opposed to the other outer peripheral surface side of the sheet-like permanent magnet wound around the outer peripheral portion of the cylindrical portion of the output shaft with a predetermined distance therebetween and excited by the second coil, in which the cylindrical portion of the output shaft is opposed to at least one of the first outer magnetic pole portion and the second magnetic pole portion in a predetermined axial range, and excited by at least one of the first coil and the second coil.

The above and other objects, features, and advantages of the invention will become more apparent from the following detailed description taken in conjunction with the accompanying drawings.

BRIEF DESCRIPTION OF THE DRAWINGS

FIGS. 4A, 4B, 4C, 4D, 4E, 4F, 4G and 4H are diagrams illustrating the rotating operation of the stepping motor of Embodiment 1 of the present invention;

DESCRIPTION OF THE PREFERRED EMBODIMENTS

In the following, the present invention will be described in detail with reference to the drawings.

The stepping motor of the present invention is as described with reference to the following Embodiments 1 through 4.

Embodiment 1

Figure 1:
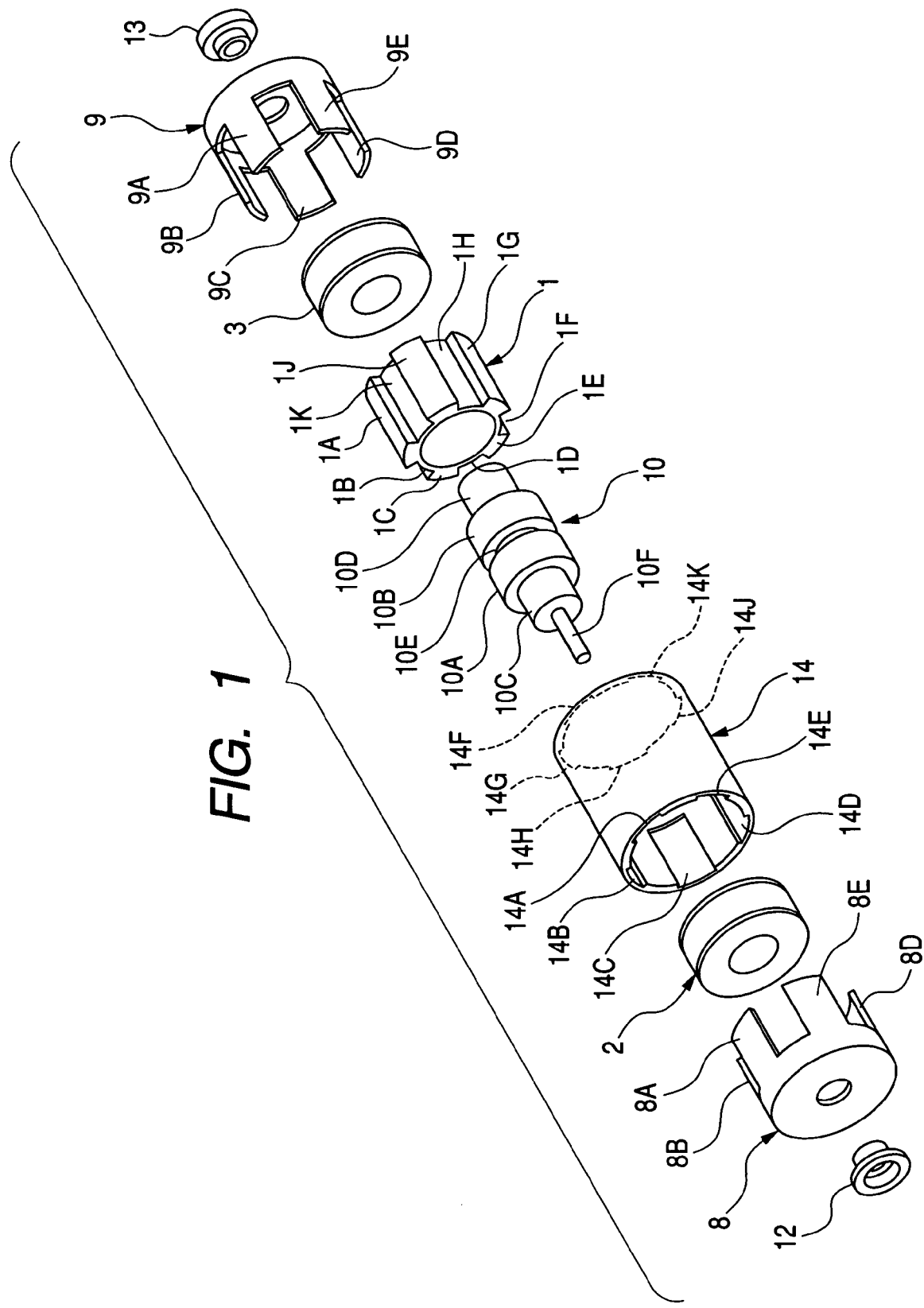
FIG. 1 is an exploded perspective view of a stepping motor according to Embodiment 1 of the present invention.
Figure 2:
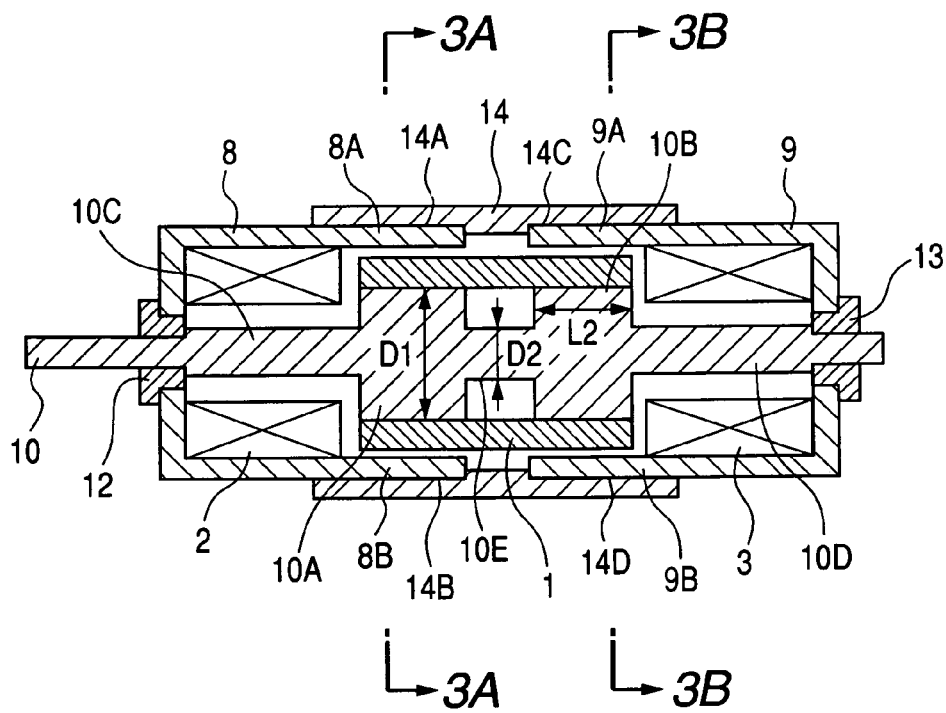
FIG. 2 is a sectional view of the stepping motor shown in FIG. 1 in an assembled and completed state.

FIGS. 1 to 4A through 4H are diagrams related to Embodiment 1 of the present invention. Of the drawings, FIG. 1 is an exploded perspective view of a stepping motor, and FIG. 2 is an axial sectional view of the stepping motor of FIG. 1 in the assembled state. FIG. 3A is a sectional view taken along the line 3A—3A of FIG. 2, and FIG. 3B is a sectional view taken along the line 3B—3B of FIG. 2.

In the drawings, reference numeral 1 indicates a cylindrical magnet ring constituting a rotor. Its outer peripheral surface is circumferentially divided into n portions at equal intervals (n is an even number, which, in this embodiment, is 10). The divided portions are formed as radial protrusions and recesses (The protrusions are indicated by symbols 1A, 1C, 1E, 1G, and 1J, and the recesses are indicated by symbols 1B, 1D, 1F, 1H, and 1K), and are radially magnetized. In Embodiment 1, the inner peripheral surface is magnetized into an S-pole, and the outer peripheral surface, that is, the side where the protrusions and recesses are formed is magnetized to N-polarity. While the present invention is also applicable to the case in which the inner peripheral surface is magnetized to N-polarity and in which the outer peripheral surface is magnetized into an S-pole, Embodiment 1 will be described as applied to the case in which the inner peripheral surface is magnetized to S-polarity and in which the outer peripheral surface (the side where the protrusions and recesses are formed) is magnetized to N-polarity. In the following, the protruding portions will be referred to as the protrusions, indicated at 1A, 1C, 1E, 1G, and 1J, and the recessed portions will be referred to as the recesses, indicated at 1B, 1D, 1F, 1H, and 1K.

The minimum value of the pitch of the protrusions and recesses depends upon the mechanical manufacturing factors. For example, in the case of a plastic magnet, recesses or protrusions of a width of approximately 0.5 mm can be easily formed. Further, the magnet ring 1 is simply polarized into the inner peripheral side and the outer peripheral side, so that a simple magnetizing device suffices. Further, it is also possible for the magnetizing device to easily form a magnetic field of sufficient strength for magnetization, so that the magnetization intensity of the magnet ring 1 can be made sufficiently high.

A first coil 2 has a cylindrical shape, and a second coil 3 has a cylindrical shape as well. The first coil 2 and the second coil 3 have their central portions coincide with the central portion of the magnet ring 1, and are arranged along the axial direction so as to sandwich the magnet ring 1. The outer diameters of the first coil 2 and the second coil 3 are substantially the same as the outer diameter of the magnet ring 1.

A first stator 8 and a second stator 9 are each formed of a soft magnetic material, and each include an external cylindrical portion having a cylindrical shape. The first stator 8 includes first outer magnetic pole portions 8A, 8B, 8C, 8D, and 8E that each have a comb tooth shape and are opposed to the protrusions of the outer peripheral surface of the magnet ring 1 so as to have a predetermined clearance therebetween. The first outer magnetic pole portions 8A to 8E are obtained by cutting out the tip portion of the external cylindrical portion of the first stator 8 having a cylindrical shape so as to be divided into multiple parts in its peripheral direction, and are each formed as a magnetic pole portion having a comb tooth shape that extends in the axial direction from one end face of the magnet ring 1. The first outer magnetic pole portions 8A to 8E are formed so as to be shifted by 360/(n/2) degrees, that is, 72 degrees. The second stator 9 similarly includes second outer magnetic pole portions 9A, 9B, 9C, 9D, and 9E that each have a comb tooth shape and are opposed to the protrusions of the outer peripheral surface of the magnet ring 1 so as to have a predetermined clearance therebetween. The second outer magnetic pole portions 9A to 9E are obtained by cutting out the tip portion of the external cylindrical portion of the second stator 9 having a cylindrical shape so as to be divided into multiple parts in its peripheral direction, and are each formed as a magnetic pole portion having a comb tooth shape that extends in the axial direction from the other end face of the magnet ring 1 which is opposite to the one end face described with respect to the first stator 8. In Embodiment 1, the second outer magnetic pole portions 9A to 9E are also formed so as to be shifted by 360/(n/2) degrees, that is, 72 degrees.

Both the first outer magnetic pole portions 8A to 8E of the first stator 8 and the second outer magnetic pole portions 9A to 9E of the second stator 9 include notches and teeth extending in parallel to the axis. With this arrangement, the magnetic pole portions can be formed with the diameter of the stepping motor being kept minimized. In other words, if the outer magnetic pole portions are formed of radially extending protrusions and recesses, the diameter of the stepping motor becomes larger by the extending length, but in Embodiment 1, the outer magnetic pole portions include the notches and the teeth extending in parallel to the axis, so that the diameter of the stepping motor can be minimized.

Both the first outer magnetic pole portions 8A to 8E of the first stator 8 and the second outer magnetic pole portions 9A to 9E of the second stator 9 have the same shape, with the tip portions of the magnetic pole portions each having the comb tooth shape being arranged to be opposed to each other. Further, as is apparent from FIG. 3A and FIG. 3B, the first stator 8 and the second stator 9 are arranged with the phases of their comb-tooth-shaped magnetic pole portions being shifted by 180/n degrees, that is, 18 degrees. The first stator 8 is excited by the first coil 2, and the second stator 9 is excited by the second coil 3.

Figure 3A:
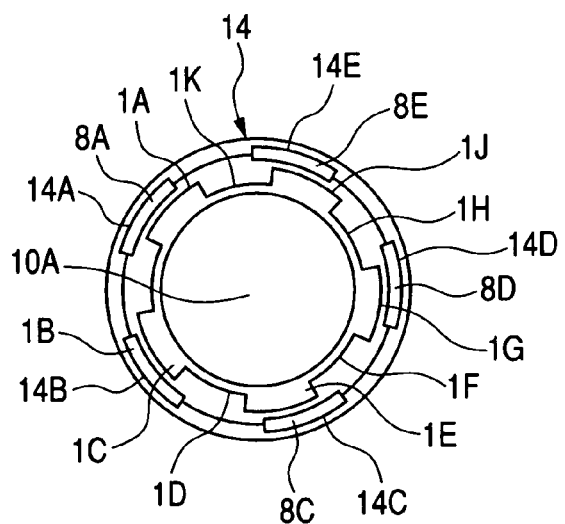
FIGS. 3A and 3B are sectional views respectively taken along the lines 3A—3A and 3B—3B of FIG. 2.
Figure 3B:
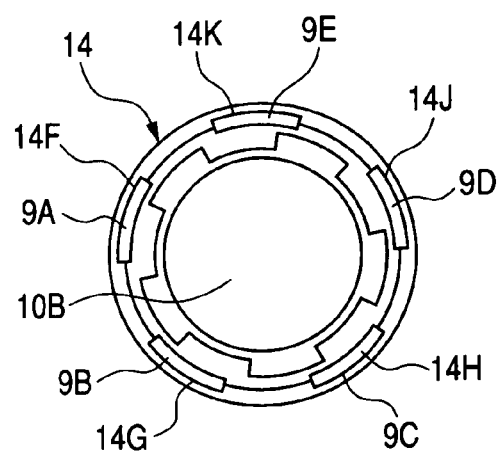

Reference numeral 10 indicates an output shaft formed of a soft magnetic material. The output shaft 10 is fixed to the inner peripheral portion of the magnet ring 1. The output shaft 10 has a first inner magnetic pole portion 10A with an outer diameter D1 at a position where it holds the magnet ring 1 between itself and the first stator 8 opposed to the magnet ring 1 within the axial range where it is opposed to the first outer magnetic pole portions 8A through 8E of the first stator 8. A portion 10C of the output shaft 10 is inserted into the inner periphery of the first coil 2, and the first inner magnetic pole portion 10A is excited by the first coil 2 into a polarity opposite to that of the first outer magnetic pole portions 8A through 8E of the first stator 8. As shown in FIG. 3A, the sectional configuration of the first inner magnetic pole portion 10A taken in a direction perpendicular to the axis is circular. Further, the output shaft 10 has a second inner magnetic pole portion 10B with an outer diameter of D1 at a position where it holds the magnet ring 1 between itself and a second stator 9 opposed to the magnet ring 1 within an axial range where it is opposed to second outer magnetic pole portions 9A through 9E of the second stator 9. A portion 10D of the output shaft 10 is inserted into the inner periphery of the second coil 3, and the second inner magnetic pole portion 10B is excited into a polarity opposite to that of the second outer magnetic pole portions 9A through 9E of the second stator 9 by the second coil 3. As shown in FIG. 3B, the sectional configuration of the second inner magnetic pole portion 10B taken along a direction perpendicular to the axis is, like that of the first inner magnetic pole portion 10A, circular. The output shaft 10 fixes the magnet ring 1 in position by the first inner magnetic pole portion 10A and the second inner magnetic pole portion 10B.

Further, formed between the first inner magnetic pole portion 10A and the second inner magnetic pole portion 10B of the output shaft 10 is a groove-like connecting portion 10E having an outer diameter D2. Of course, D1>D2. Since D2 is of small diameter, the magnetic resistance in the portion between the first inner magnetic pole portion 10A and the second inner magnetic pole portion 10B can be made large. As a result, it is possible to prevent the magnetic flux generated through energization of the first coil 2 from influencing the second coil 2, the second outer magnetic pole portions 9A through 9E, and the second inner magnetic pole portion 10B through the output shaft 10 formed of soft magnetic material to thereby make the rotation unstable, and to prevent the magnetic flux generated through energization of the second coil 3 from influencing the first coil 2, the first outer magnetic pole portions 8A through 8E, and the first inner magnetic pole portion 10A through the output shaft 10 formed of soft magnetic material to thereby make the rotation unstable. Further, if D1=D2, it helps to increase the mechanical strength of the magnet as described below and serves as a back metal, and the permeance coefficient of the magnetic circuit is set high, mitigating a magnetic deterioration due to demagnetization if used under high temperature environment. Further, the first stator 8 and the second stator 9 are of a cup-like configuration, and can be formed in a simple shape with a cutout provided in the outer cylinder portion, thus facilitating the production and assembly and making it possible to easily secure the axial length through which the inner magnetic pole portion and the magnet are opposed to each other, thus enhancing the motor output. Thus, this structure is sufficiently advantageous even if the connecting portion 10E is not formed such that D1>D2.

A first bearing 12 formed of a non-magnetic material is fixed to the first stator 8, and rotatably supports the output shaft 10 by rotatably engaging with a shaft portion 10G of the output shaft 10. Similarly, a second bearing 13 formed of a non-magnetic material is fixed to the second stator 9, and rotatably supports the output shaft 10 by rotatably engaging with the shaft portion 10G of the output shaft 10. Since the first bearing 12 and the second bearing 13 are each formed of a non-magnetic material, it is possible to prevent the adsorption due to the magnetic force generated between the first stator 8 and the output shaft 10 and the adsorption due to the magnetic force generated between the second stator 9 and the output shaft 10, thus achieving improved rotation characteristics and durability.

Note that the first bearing 12 and the second bearing 13 may be formed of a soft magnetic material. In that case, the magnetic resistance of the magnetic circuit becomes small, and the generated torque itself becomes large. Naturally, an adsorption force may be generated between the first bearing 12 and the output shaft 10 or between the second bearing 13 and the output shaft 10 to cause a torque loss due to a frictional force or impair durability of sliding surfaces. However, by subjecting the surfaces of the first bearing 12, output shaft 10, and second bearing 13 to coating with a lubricant, lubricant coating (fluorine-based lubricant coating, graphite-based lubricant coating, molybdenum disulfide-based lubricant coating, or the like), lubricant plating (for example, plating of electroless nickel containing polytetrafluoro-ethylene (PTFE) particles, electroless nickel plating using a Teflon (registered trademark) lubricant, or the like), or the like, the torque loss due to the friction between the sliding surfaces can be suppressed, the impairment of the durability of sliding surfaces can be prevented, and the stepping motor having a large output torque can be achieved.

The first coil 2 is arranged between the external cylindrical portion of the first stator 8 and the output shaft 10 and in the vicinity of a connecting portion disposed via the first bearing 12, such that one end side of the magnet ring 1 is sandwiched between the first outer magnetic pole portions 8A through 8E of the first stator 8 and the first inner magnetic pole portion 10A of the output shaft 10. The second coil 3 is arranged between the external cylindrical portion of the second stator 9 and the output shaft 10 and in the vicinity of a connecting portion disposed via the second bearing 13, such that the other end side of the magnet ring 1 is sandwiched between the second outer magnetic pole portions 9A through 9E of the second stator 9 and the second inner magnetic pole portion 10B of the output shaft 10. In other words, the first outer magnetic pole portions 8A through 8E and the second outer magnetic pole portions 9A through 9E are opposed to the outer peripheral surface of the magnet ring 1, the first inner magnetic pole portion 10A and the second inner magnetic pole portion 10B are located on the inner peripheral surface of the magnet ring 1, the first outer magnetic pole portions 8A through 8E are opposed to the first inner magnetic pole portion 10A, and, similarly, the second outer magnetic pole portions 9A through 9E are opposed to the second inner magnetic pole portion 10B.

A coupling ring 14 formed of a cylindrical shape includes grooves 14A, 14B, 14C, 14D, and 14E formed on one end side of an inside portion of the coupling ring 14 and grooves 14F, 14G, 14H, 14J, and 14K formed on the other end side thereof. The phase of the grooves 14F through 14K and the phase of the grooves 14A through 14E are shifted by 180/n degrees, that is, 18 degrees. The grooves 14A through 14E and the grooves 14F through 14K are formed so as to have a predetermined axial distance therebetween. The first outer magnetic pole portions 8A through 8B and the second outer magnetic pole portions 9A through 9E are fitted into the grooves 14A through 14E and the grooves 14F through 14K, respectively, to be fixed by an adhesive or the like. By fixing the first stator 8 and the second stator 9 to the coupling ring 14 as described above, the first stator 8 and the second stator 9 can be arranged in desired positions and phases. Also, the coupling ring 14 is formed of a non-magnetic material, so that the magnetic circuit can be separated by a region between the first stator 8 and the second stator 9, making it difficult for the magnetic poles to affect each other.

According to Embodiment 1, the inner periphery of the magnet ring 1 is supported by the first inner magnetic pole portion 10A and second inner magnetic pole portion 10B of the output shaft 10. Hence, the magnet has a larger mechanical strength than that of the stepping motor proposed in Japanese Patent Application Laid-Open No. H09-331666 (U.S. Pat. No. 5,831,356) or that of the stepping motor proposed in Japanese Patent Application Laid-Open No. H10-229670. Further, the output shaft 10 functions as a so-called back metal for reducing the magnetic resistance between the S pole and the N pole that are generated in the inner periphery and outer peripheral portion of the magnet ring 1, respectively, so that a permeance coefficient of the magnetic circuit is set high. Accordingly, even if used under a high temperature environment, the magnet ring 1 rarely undergoes magnetic deterioration due to demagnetization.

The first stator 8 and the second stator 9 are of a simple configuration consisting of a cup-like shape with a cutout provided in the external cylinder portion, thereby facilitating the assembly. If the stepping motor is structured in the same manner as that of Japanese Patent Application Laid-Open No. H09-331666 (U.S. Pat. No. 5,831,356) or Japanese Patent Application Laid-Open No. H10-229670, each of the first stator and the second stator needs to have its inner magnetic pole portions formed integrally with the outer magnetic pole portions, and the manufacture is rather difficult when the inner magnetic pole portions and the outer magnetic pole portions are to be formed as a unitary part. For example, it takes higher cost to mold the part by metal injection molding. It also becomes more difficult to unitarily manufacture the part by pressing as the part becomes smaller in size as compared with the case of manufacturing a part forming the outer magnetic pole portion. Further, in the case where the inner magnetic pole portions and the outer magnetic pole portions are separately manufactured and then integrally fixed to one another by caulking, welding, bonding, etc., the manufacturing cost increases. In other words, the conventional motor as disclosed in Japanese Patent Application Laid-Open No. H09-331666 (U.S. Pat. No. 5,831,356) or Japanese Patent Application Laid-Open No. H10-229670 needs at least nine parts in total (two coils, a magnet ring, an output shaft, a first stator composed of two parts for forming outer magnetic pole portions and inner magnetic pole portions, a second stator composed of two parts for forming outer magnetic pole portions and inner magnetic pole portions, and a coupling ring), while the motor according to Embodiment 1 can be structured by seven parts in total (two coils, a magnet ring, one output shaft as an output shaft, a first stator composed of a part for forming outer magnetic pole portions, a second stator composed of a part for forming outer magnetic pole portions, and a coupling ring), thereby reducing the manufacturing cost and facilitating the manufacture.

Further, the motor as disclosed in Japanese Patent Application Laid-Open No. H09-331666 (U.S. Pat. No. 5,831,356) or Japanese Patent Application Laid-Open No. H10-229670 needs to be assembled while maintaining the precision of the clearances between the outer periphery of the magnet ring and the outer magnetic pole portions. Moreover, the magnet ring and the inner magnetic pole portions opposed to the inner periphery of the magnet ring need to be arranged so as to have a predetermined clearance therebetween; the predetermined clearance may not be secured due to the variation of parts precision or the lack of assembly precision, increasing the risk of causing a defect that an inner magnetic pole portion contacts the magnet ring, or the like. On the contrary, according to Embodiment 1, the clearance needs to be controlled only with respect to the outer periphery of the magnet ring, thereby facilitating the manufacture. Further, unlike the construction in which the first inner magnetic pole portion and the second inner magnetic pole portion are formed of separate components, this embodiment adopts a construction formed of a single component, whereby it is possible to obtain a stepping motor with little mutual difference and high accuracy.

Figure 11:
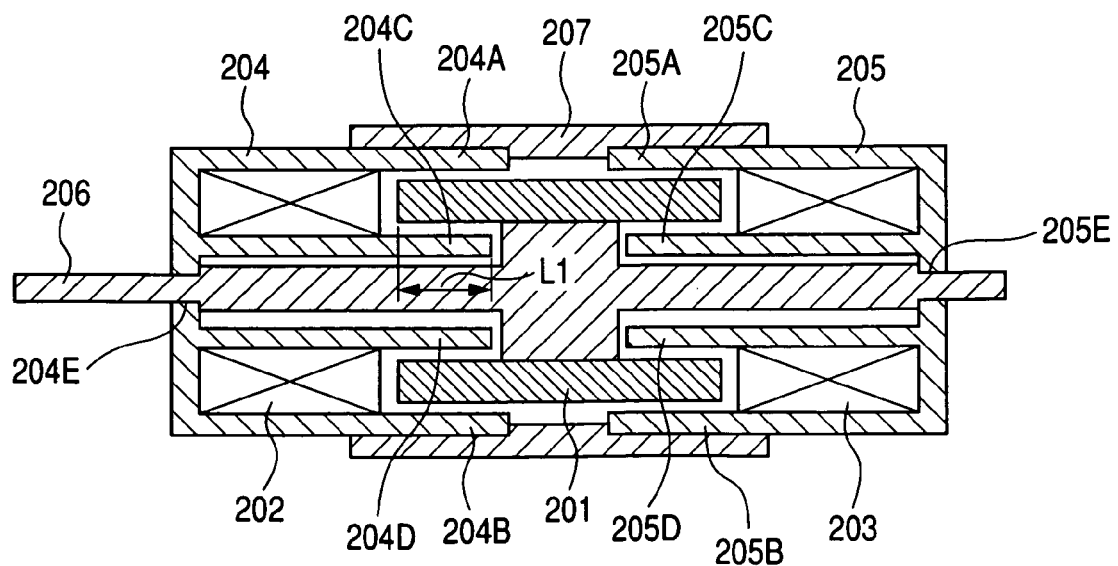
FIG. 11 is a sectional view of the stepping motor shown in FIG. 10 in an assembled and completed state.

Further, the motor as disclosed in Japanese Patent Application Laid-Open No. H09-331666 (U.S. Pat. No. 5,831,356) or Japanese Patent Application Laid-Open No. H10-229670 needs to be structured such that the inner magnetic pole portions do not contact a portion where the magnet ring and the output shaft are connected, making it impossible to secure a sufficient axial length (indicated by L1 of FIG. 11) of a region where the inner magnetic pole portions and the magnet ring are opposed to each other. On the contrary, according to Embodiment 1, as indicated by L2 of FIG. 2, a sufficient axial length can easily be secured for the region where the inner magnetic pole portions and the magnet ring are opposed to each other. Accordingly, the outer magnetic pole portions and the magnet ring can be put to effective use, and the output of the stepping motor can be enhanced.

The magnet ring 1 has the outer peripheral surface thereof circumferentially divided at equal intervals into n portions (n is an even number, which, in Embodiment 1, is 8), with protrusions and recesses being formed radially. In Embodiment 1, the inner peripheral surface is magnetized into an S-pole, and the outer peripheral surface, that is, the side where the protrusions and recesses are formed, is magnetized to N-polarity. Further, the magnet ring 1 is simply polarized into the inner peripheral side and the outer peripheral side, so that the magnetizing device may be a simple one. Further, the magnetizing device can easily form a magnetic field of a sufficient strength for magnetization, so that the magnetization intensity of the magnet can be made sufficiently high.

FIGS. 4A to 4D are sectional views taken along the line 3A—3A of FIG. 2, and FIGS. 4E to 4H are sectional views taken along the line 3B—3B of FIG. 2. With reference to these sectional views, the rotation of the stepping motor will be illustrated. FIGS. 4A and 4E are sectional views at the same point in time, and FIGS. 4B and 4F are sectional views at the same point in time; FIGS. 4C and 4G are sectional views at the same point in time, and FIGS. 4D and 4H are sectional views at the same point in time.

In the state of FIGS. 4A and 4E, the first coil 2 and the second coil 3 are energized, and the first outer magnetic pole portions 8A through 8E and the second outer magnetic pole portions 9A through 9E are excited into N-polarity. Here, of the protrusions and recesses constituting the outer peripheral portion of the magnet ring 1, the recesses 1B, 1D, IF, 1H, and 1K are magnetized into N-polarity; however, they are radially spaced apart from the first outer magnetic pole portions 8A through 8E and the second outer magnetic pole portions 9A through 9E, so that they do not greatly affect the driving force. Further, the thickness of the protrusions 1A, 1C, 1E, 1G, and 1J as measured from the inner periphery is larger than that of the recesses 1B through 1K, so that the magnetization intensity is high; further, the radial distance from the first outer magnetic pole portions 8A through 8E and the outer magnetic pole portions 9A through 9E is small, so that the driving force is greatly affected. That is, in considering the electromagnetic force, it is only necessary to mainly take into account the relationship between the protrusions 1A through 1J, the first outer magnetic pole portions 8A through 8E, and the second outer magnetic pole portions 9A through 9E.

In the state of FIGS. 4A and 4E, the energizing direction of the second coil 3 is switched and the outer magnetic pole portions 8A through 8E of the first stator 8 are excited into N-polarity; when, in this state, the outer magnetic pole portions 9A through 9E of the second stator 9 are excited into S-polarity, the magnet ring 1 constituting the rotor is rotated clockwise by 18 degrees, and the state as shown in FIGS. 4B and 4F is attained. Next, when the energization of the first coil 2 is reversed, the outer magnetic pole portions 8A through 8E of the first stator 8 are excited into S-polarity, and the outer magnetic pole portions 9A through 9E of the second stator 9 are excited into S-polarity, the magnet ring 1 constituting the rotor further rotates clockwise by 18 degrees, and the state as shown in FIGS. 4C and 4G is attained. Next, the energization of the second coil 3 is reversed, and the outer magnetic pole portions 8A through 8E of the first stator 8 are excited into S-polarity. When, in this state, the outer magnetic pole portions 9A through 9E of the second stator 9 are excited into N-polarity, the magnet ring 1 constituting the rotor further rotates clockwise by 18 degrees, and the state as shown in FIGS. 4D and 4H is attained.

From this onward, the energizing direction for the second coil 2 and the second coil 3 is successively switched, whereby the magnet ring 1 constituting the rotor rotates sequentially to a position corresponding to the energization phase.

Further, it is also possible to axially provide two magnetization layers formed through circumferential division of the outer peripheral surface of the magnet ring 1, the phase of one magnetization layer opposed to the first stator 8 and the phase of the other magnetization layer opposed to the second stator 9 being deviated by 180/n degrees, the first stator 8 and the second stator 9 being of the same phase.

In Embodiment 1 described above, as in the constructions as disclosed in Japanese Patent Application Laid-Open No. H09-331666 (U.S. Pat. No. 5,831,356) and Japanese Patent Application Laid-Open No. H10-229670, the magnetic flux generated through energization of the coil is caused to act directly upon the magnet, enhancing the output of the stepping motor and achieving a marked reduction in size. That is, it is only necessary for the diameter of this motor to be large enough to consist of the magnet diameter plus a size allowing opposition to the stator magnetic pole portion, and it is only necessary for the length of the stepping motor to be the length of the magnet ring plus the lengths of the first coil and the second coil. Thus, the size of the stepping motor is determined by the diameters and lengths of the magnet ring and the coil, and, by making the diameters and lengths of the magnet ring and the coil very small, it is possible to construct a very small stepping motor.

When the diameters and lengths of the magnet ring and the coil are made very small, it is rather difficult to maintain the requisite precision for the stepping motor; this problem, however, can be solved by a simple construction in which the magnet ring is formed in a cylindrical configuration and in which the outer magnetic pole portions and inner magnetic pole portions of the first and second stators are opposed to the outer peripheral surface and the inner peripheral surface of this cylindrical magnet ring. Further, as described above, it is possible to realize a high output stepping motor at low cost. As disclosed in Japanese Patent Application Laid-Open No. H09-331666 (U.S. Pat. No. 5,831,356) and Japanese Patent Application Laid-Open No. H10-229670, one stator may be formed with a predetermined gap from the inner peripheral portion of the magnet ring, and the other stator may be formed so as to constitute the inner magnetic pole portion with an output shaft formed of a soft magnetic material as in Embodiment 1; in this case also, it is possible, as stated above, to achieve an improvement in performance over those as disclosed in Japanese Patent Application Laid-Open No. H09-331666 (U.S. Pat. No. 5,831,356) and Japanese Patent Application Laid-Open No. H10-229670.

The rotation index pitch of this stepping motor is (180/n) degrees. n is the number of radial protrusions and recesses, which are formed by dividing the outer peripheral surface of the magnet ring 1 circumferentially at equal intervals. That is, the larger the number of protrusions and recesses, the finer the motor rotation index pitch can be.

As stated above, the minimum value of the pitch of the protrusions and recesses depends upon the mechanical manufacturing factors; for example, in the case of a plastic magnet, recesses or protrusions of a width of approximately 0.5 mm can be easily formed, making it possible to form a stepping motor whose resolution is improved as compared with the motor disclosed in Japanese Patent Application Laid-Open No. H09-331666 (U.S. Pat. No. 5,831,356). Further, the magnet ring 1 is simply polarized into the inner peripheral side and the outer peripheral side, so that a simple magnetizing device suffices; further, the magnetizing device can easily form a magnetic field of sufficient intensity for magnetization, so that the magnetization intensity of the magnet can be made sufficiently high.

Embodiment 2

Figure 5:
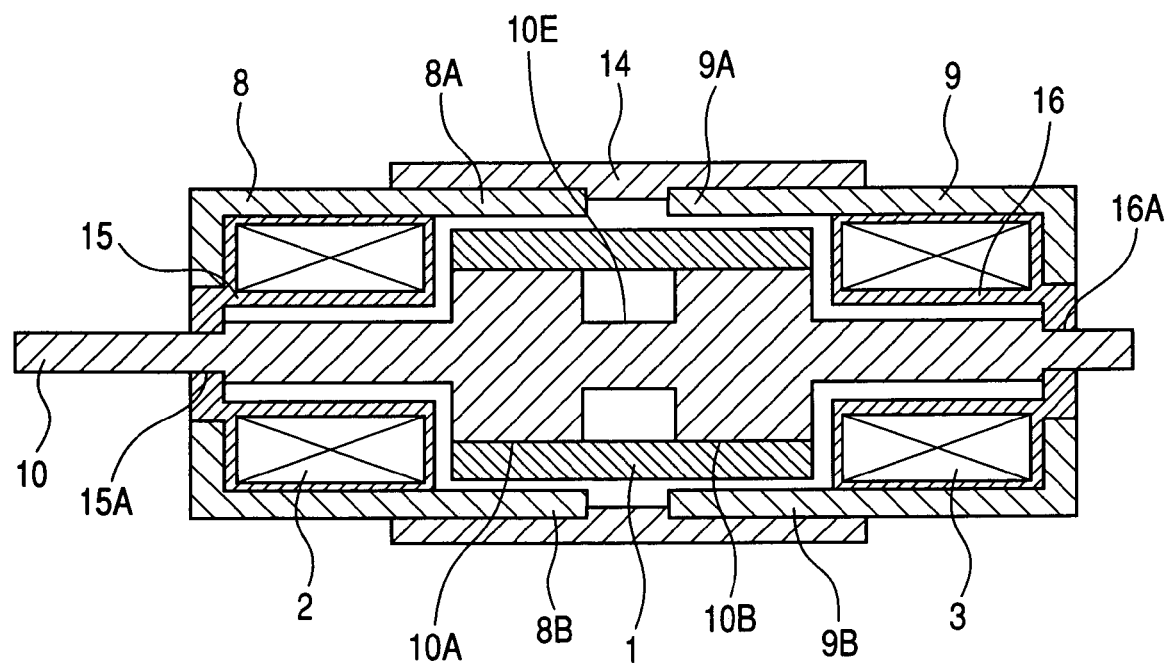
FIG. 5 is a sectional view of a stepping motor according to Embodiment 2 of the present invention in an assembled and completed state.

FIG. 5 is a sectional view of a stepping motor according to Embodiment 2 of the present invention. The components that are the same as those of Embodiment 1 are indicated by the same symbols, and a description thereof will be omitted.

In FIG. 5, reference numeral 15 indicates a first bobbin, around which the first coil 2 is wound. The first bobbin 15 is formed of a non-magnetic and non-conductive material, preventing inadvertent conduction between the first coil 2 and the first stator 8. The first bobbin 15 is fixed to the first stator 8, and the output shaft 10 is rotatably held by a hole 15A, providing the same function as the first bearing 12 of Embodiment 1. Reference numeral 16 indicates a second bobbin, around which the second coil 3 is wound. The second bobbin 16 is also formed of a non-magnetic and non-conductive material, preventing inadvertent conduction between the second coil 3 and the second stator 9. The second bobbin 16 is fixed to the second stator 9, and the output shaft 10 is rotatably held by a hole 16A, providing the same function as the second bearing 13 of Embodiment 1.

In Embodiment 2, the component that prevents inadvertent conduction between the first coil 2 and the first stator 8 and, at the same time, prevents attraction of the first stator 8 and the output shaft 10 to each other, is formed of a single component, that is, the first bobbin 15, so that the assembly is facilitated and a reduction in cost is achieved, making it possible to perform stable operation. Similarly, the component that prevents inadvertent conduction between the second coil 3 and the second stator 9 and, at the same time, prevents attraction of the second stator 9 and the output shaft 10 to each other, is formed of a single component, that is, the second bobbin 16, so that the assembly is facilitated and a reduction in cost is achieved, making it possible to perform stable operation.

Embodiment 3

Figure 6:
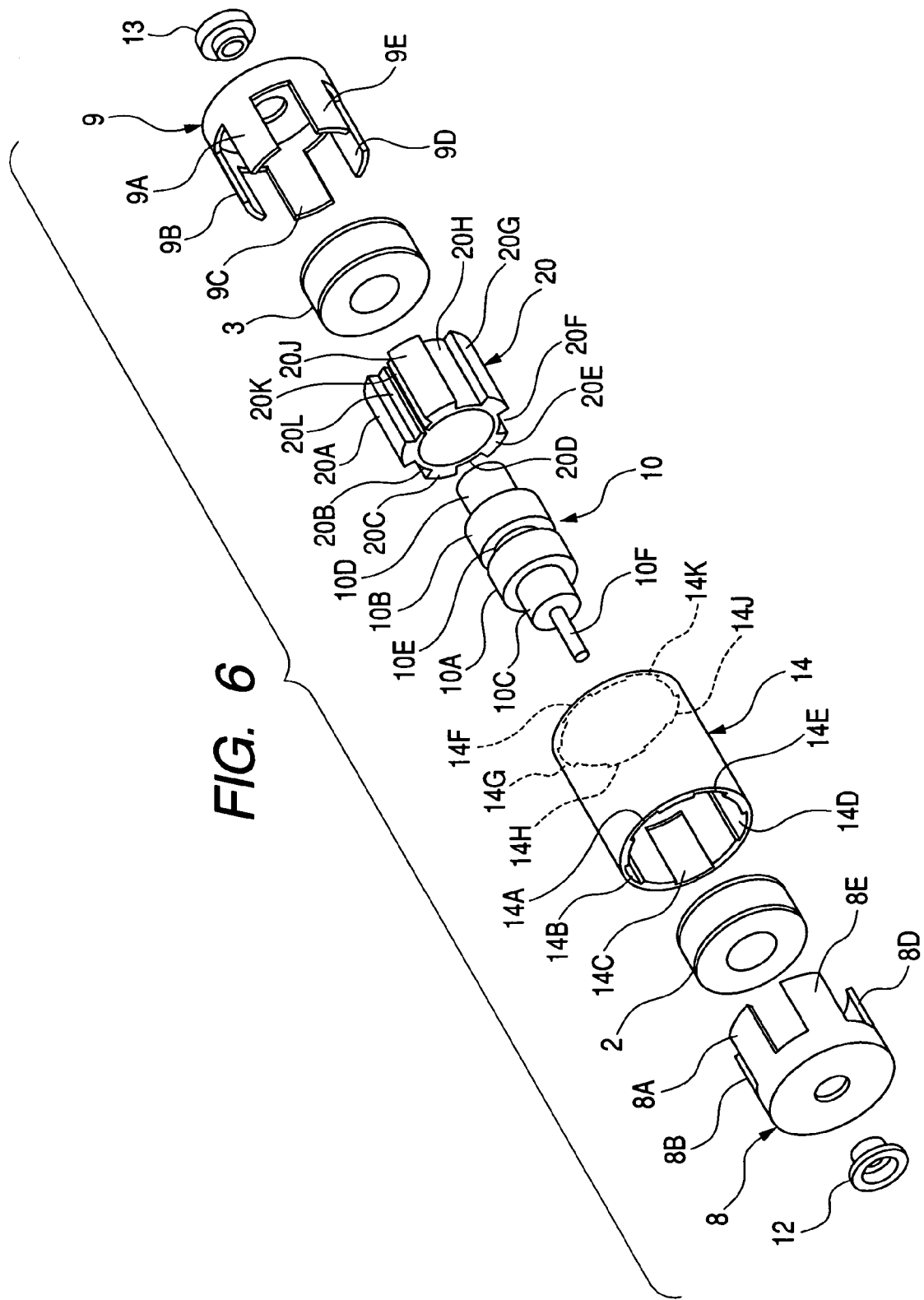
FIG. 6 is an exploded perspective view of a stepping motor according to Embodiment 3 of the present invention.
Figure 7A:
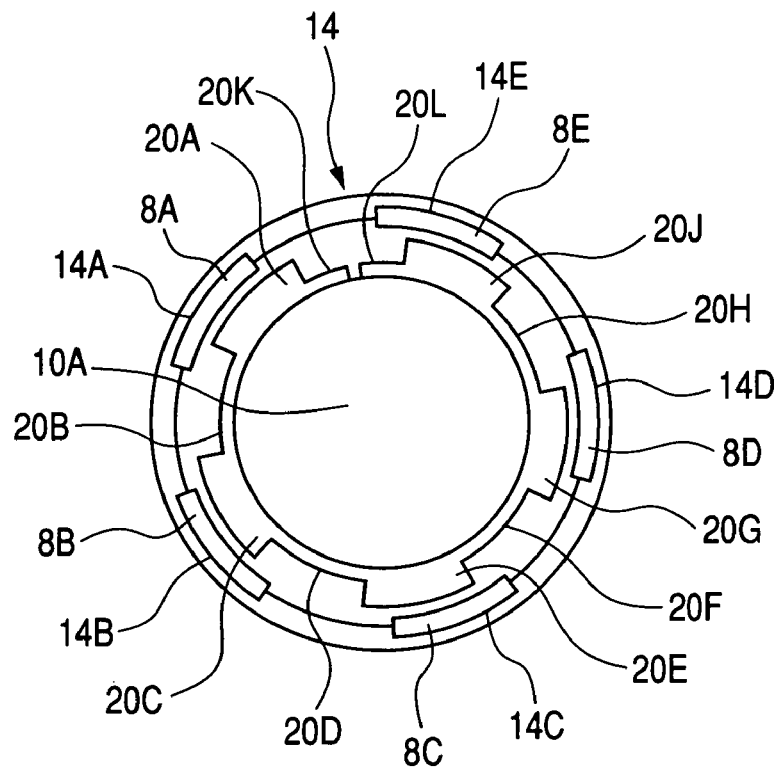
FIGS. 7A and 7B are sectional views of the stepping motor of FIG. 6.
Figure 7B:
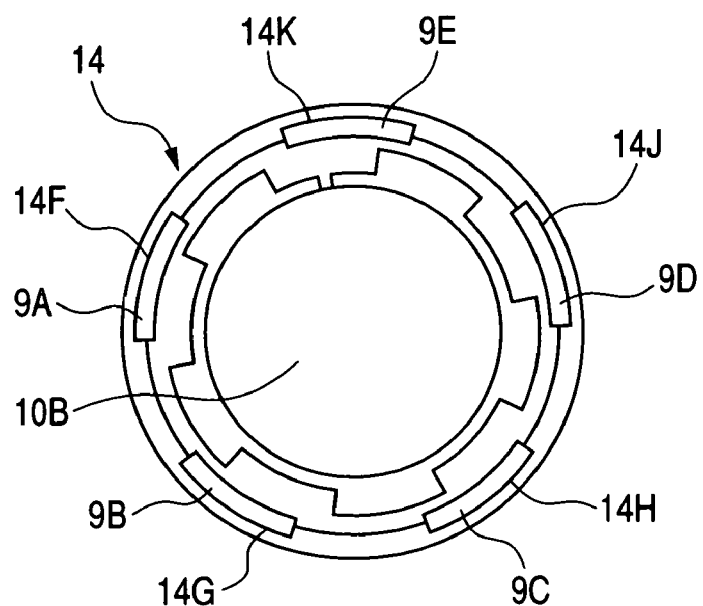

FIG. 6 is a perspective view of the construction of a sheet-like magnet (permanent magnet) according to Embodiment 3 of the present invention. FIGS. 7A and 7B are sectional views of the output shaft of a stepping motor according to Embodiment 3 of the present invention, and a sheet-like magnet wound around the output shaft. More specifically, FIG. 7A is a sectional view of a portion near the first inner magnetic pole portion taken along a direction perpendicular to the axis, corresponding to FIG. 3A of Embodiment 1, and FIG. 7B is a sectional view of a portion near the second inner magnetic pole portion taken along a direction perpendicular to the axis, corresponding to FIG. 3B of Embodiment 1. The components that are the same as those of FIGS. 1 to 4A through 4H are indicated by the same symbols, and a detailed description thereof will be omitted.

In these drawings, reference numeral 20 indicates a sheet-like magnet formed of a flexible material, such as rubber, having on one side of which recess-like groove portions and protrusion-like rail portions formed alternately and at equal intervals. The rail portions, indicated at 20A, 20C, 20E, 20G, and 20J, correspond to the protrusions 1A, 1C, 1E, 1G, and 1J, and the groove portions, indicated at 20B, 20D, 20F, 20H, 20K, and 20L, correspond to the recesses 1B, 1D, 1F, 1H, and 1K; thus, in the following, the groove portions will be referred to as the recesses, and the rail portions will be referred to as the protrusions.

As in Embodiment 1, the side where there are protrusions and recesses are magnetized to N-polarity, and the surface on the opposite side thereof is magnetized to S-polarity. Of course, as in Embodiment 1, it is also possible to magnetize the side where there are protrusions and recesses to S-polarity, and to magnetize the opposite side to N-polarity. The end surfaces of the sheet-like magnet 20 are formed by the recesses 20L and 20K, and the sheet-like magnet 20 is wound around and fixed to the first inner magnetic pole portion 10A and the second inner magnetic pole portion 10B of the output shaft 10, thereby forming what is referred to as the cylindrical magnet ring in Embodiment 1. This is shown in FIGS. 7A and 7B. The end surfaces of the sheet-like magnet 20 are formed by the recesses 20L and 20K, and these portions constitute the winding-start portion and the winding-end portion with respect to the output shaft 10.

In the above construction, even if there is a gap between the winding-start portion and the winding-end portion due to a dimensional error in the sheet-like magnet 20, the gap portion is formed by the recesses 20L and 20K which has substantially no influence on the driving force, so that no deterioration in the motor characteristics is involved. Further, in Embodiment 3, the magnet ring is formed by a sheet-like magnet, so that the assembly is facilitated and an improvement in cost is achieved.

Embodiment 4

Figure 8:
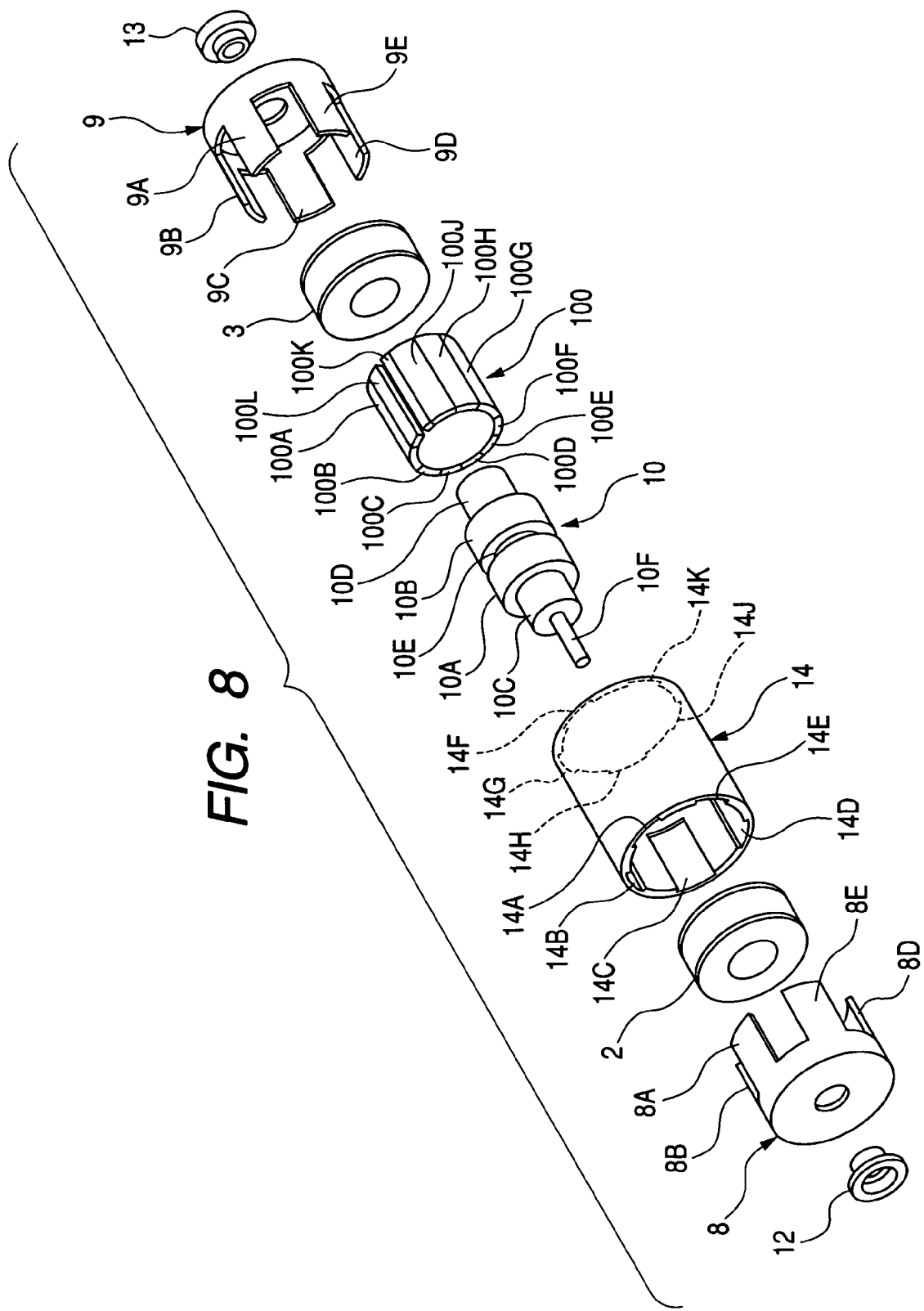
FIG. 8 is an exploded perspective view of a stepping motor according to Embodiment 4 of the present invention.
Figure 9:
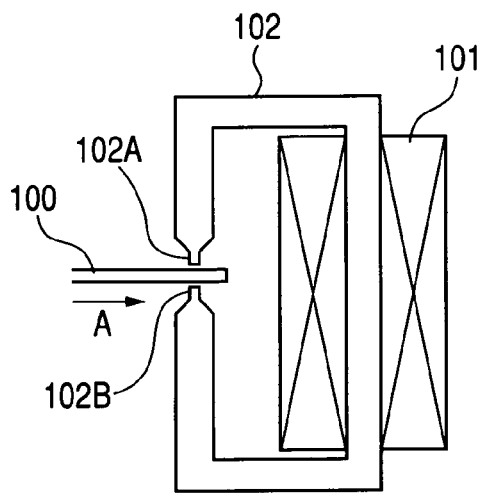
FIG. 9 is a diagram illustrating how the sheet-like magnet of FIG. 8 is magnetized.
Figure 10:
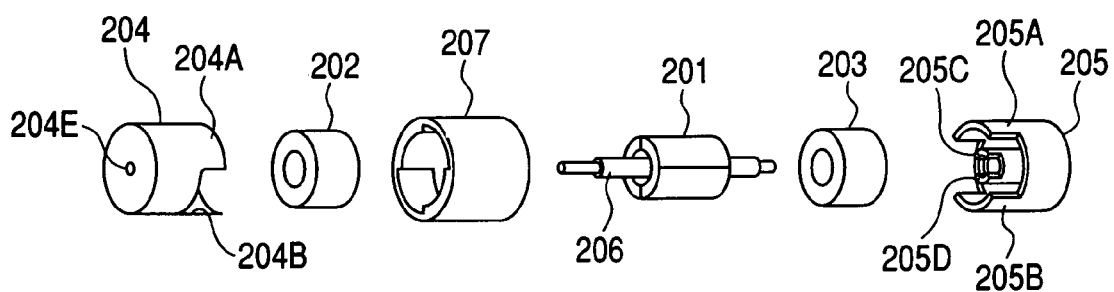
FIG. 10 is an exploded perspective view of a conventional stepping motor.

FIGS. 8 and 9 show Embodiment 4 of the present invention. More specifically, FIG. 8 is a perspective view showing the construction of a stepping motor, and FIG. 9 is a conceptual drawing showing how magnetization is effected on a sheet-like magnet (permanent magnet). The components that are the same as those of FIGS. 1 to 4A through 4H are indicated by the same symbols, and a detailed description thereof will be omitted.

In these drawings, reference numeral 100 indicates a sheet-like permanent magnet using a flexible material, such as rubber, as the base; its front surface is alternately magnetized to S- and N-polarities, and its back surface is alternately magnetized to polarities reverse to the front surface. The sheet-like magnet 100 is wound around and fixed to the first inner magnetic pole portion 10A and the second inner magnetic pole portion 10B to thereby form a cylindrical magnet ring, which is divided along the circumferential direction, with N- and S-poles being alternately arranged.

FIG. 9 is a conceptual drawing showing how magnetization is effected on the sheet-like magnet. Reference numeral 101 indicates a magnetization coil, and reference numeral 102 indicates a magnetization yoke. By causing an electric current to flow through the magnetization coil 101, the magnetization yoke 102 is excited, and a magnetic field is generated between the magnetic pole portion 102A and the magnetic pole portion 102B; by inserting the sheet-like magnet 100 between them, only that portion of the magnet 100 which is held between the magnetic pole portion 102A and the magnetic pole portion 102B is magnetized. That is, when the magnet is fed in the direction of the arrow A by an amount corresponding to the magnetization pitch, and electric current is caused to flow with the energizing direction of the magnetization coil 101 changed, only that portion of the magnet 100 which is held between the magnetic pole portion 102A and the magnetic pole portion 102B is magnetized to an opposite polarity. By repeating this process, it is possible to easily effect magnetization with high magnetization intensity at a fine magnetization pitch. As compared with the case in which the magnet is formed in a cylindrical shape and then its outer peripheral surface is circumferentially magnetized alternately to S- and N-polarities, it is possible to effect magnetization with higher magnetization intensity and at a finer magnetization pitch, making it possible to realize a large number of magnetization poles even if the stepping motor is reduced in size.

In this way, the surface of the sheet-like magnet 100 is magnetized. More specifically, the surfaces on the side opposite to the first inner magnetic pole portion 10A and the second inner magnetic pole portion 10B of the output shaft 10, that is, the surfaces constituting the outer peripheral surfaces, 100A, 100C, 100E, 100G, and 100J are magnetized to N-polarity, and the surfaces 100B, 100D, 100F, 100H, 100K, and 100L, similarly constituting the outer peripheral surfaces, are magnetized to S-polarity. Thus, in the state in which the sheet magnet is wound around and fixed to the first inner magnetic pole portion 10A and the second inner magnetic pole portion 10B to form what is referred to as the cylindrical magnet ring in Embodiment 1, it is circumferentially divided at equal intervals, with N- and S-poles being arranged alternately.

The effects of Embodiments 1 through 4, described above, are as follows:

1) According to Embodiments 1 through 3, the rotation index pitch of the stepping motor is (180/n) degrees, where n is the number of radial protrusions and recesses formed by circumferentially dividing the outer peripheral surface of the sheet-like magnet 20 at equal intervals. That is, the larger the number of protrusions and recesses, the finer the motor rotation index pitch can be. The minimum value of the pitch of the protrusions and recesses depends upon the mechanical manufacturing factors; for example, in the case of a plastic magnet, recesses or protrusions of a width of approximately 0.5 mm can be easily formed, making it possible to form a stepping motor whose resolution is improved as compared with the motor disclosed in Japanese Patent Application Laid-Open No. H09-331666 (U.S. Pat. No. 5,831,356). Further, the magnet ring 1 and the sheet-like magnet 20 are each simply polarized into the inner peripheral side and the outer peripheral side, so that a simple magnetizing device suffices; further, the magnetizing device can easily form a magnetic field of sufficient intensity for magnetization, so that the magnetization intensity of the magnet ring 1 and the sheet-like magnet 20 can be made sufficiently high. Thus, it is possible to provide a high output and high resolution stepping motor without hindering a reduction in size and at lower cost.

2) Further, according to Embodiments 3 and 4, the sheet-like magnet 20, 100 using a flexible material, such as rubber, as the base is wound around and fixed to the first inner magnetic pole portion 10A and the second inner magnetic pole portion 10B of the output shaft 10 to form a cylindrical magnet ring, so that magnetization can be easily effected at a fine magnetization pitch and with high magnetization intensity, and a further reduction in cost can be achieved. In particular, according to Embodiment 3, the end surfaces of the sheet-like magnet 20 are formed by the recesses (groove portions) 20L and 20K, and the winding-start portion and the winding-end portion are formed by the recess portions, so that, even if there is a gap between the winding-start portion and the winding-end portion due to a dimensional error in the sheet-like magnet 20, the driving force is not substantially affected, and the motor characteristics are not impaired.

3) The magnetic flux generated by the first coil 2 passes between the magnet ring 1, the first outer magnetic pole portions 8A through 8E opposed to the outer peripheral surface of the sheet-like magnet 20, 100 formed in a cylindrical configuration and the magnet ring 1, and the first inner magnetic pole portion 10A of the output shaft 10 fixed to the inner peripheral surface of the magnet 20, 100, so that the magnetic flux effectively acts on the magnet ring 1, and the magnet 20, 100. Similarly, the magnetic flux generated by the second coil 3 passes between the magnet ring 1, the second outer magnetic pole portions 9A through 9E opposed to the outer peripheral surface of the sheet-like magnet 20, 100 and the magnet ring 1, and the second inner magnetic pole portion 10B of the output shaft 10 fixed to the inner peripheral surface of the magnet 20, 100, so that the magnetic flux effectively acts on the magnet ring 1, and the magnet 20, 100. In this regard, the first inner magnetic pole portion 10A and the second inner magnetic pole portion 10B do not require provision of a gap between them and the inner peripheral surfaces of the magnet ring 1, and the magnet 20, 100, so that, as compared with Japanese Patent Application Laid-Open No. H09-331666 (U.S. Pat. No. 5,831,356) and Japanese Patent Application Laid-Open No. H10-229670, it is possible to reduce the distance between the outer magnetic pole portions 8A through 8E and the first and second inner magnetic pole portions 10A and 10B, making it possible to reduce the magnetic resistance and enhance the output.

4) The first inner magnetic pole portion 10A and the second inner magnetic pole portion 10B are formed by a single output shaft 10, so that, as compared with the case in which the outer and inner magnetic pole portions are connected or integrally formed as disclosed in Japanese Patent Application Laid-Open No. H09-331666 (U.S. Pat. No. 5,831,356) and Japanese Patent Application Laid-Open No. H10-229670, the production is facilitated, and a reduction in cost is achieved.

5) The magnet ring 1 has the output shaft 10 fixed to the inner periphery thereof, and the sheet-like magnet 20, 100 is wound around and fixed to the output shaft 10, so that the mechanical strength of the magnet ring 1 and of the sheet-like magnet 20, 100 is increased. Further, the output shaft 10 acts as a back metal, so that the magnet ring 1 and the magnet 20, 100 formed in a cylindrical configuration suffer little magnetic deterioration.

6) The inner magnetic pole portions 10A and 10B can be axially elongated, so that it is possible to effectively utilize the outer magnetic pole portions 8A through 8E and 9A through 9E, the magnet ring 1, and the sheet-like magnet 20, 100 formed in a cylindrical configuration, making it possible to enhance the output of the stepping motor. Further, since it is only necessary to control the gap between the outer peripheral portions of the magnet ring 1, and the magnet 20, 100 (the outer peripheral side) and the outer magnetic pole portions 8A through 8E and 9A through 9E, the assembly is facilitated.

7) The first coil 2 and the second coil 3 are substantially of the same diameter as the magnet ring 1 and the magnet 20, 100 formed in a cylindrical configuration, and are arranged so as to hold the magnet ring 1 and the magnet 20, 100 formed in a cylindrical configuration with respect to the axial direction, so that it is possible to reduce the outer diameter of the stepping motor.

8) Further, as shown in FIG. 5, the first inner magnetic pole portion 10A and the second inner magnetic pole portion 10B each have an outer diameter of D1, and the connecting portion 10E having an outer diameter of D2 smaller than D1 is formed between the first inner magnetic pole portion 10A and the second inner magnetic pole portion 10B, whereby the magnetic resistance in the connecting portion becomes large. As a result, a situation can be avoided where the magnetic flux lines generated by energization of the first coil 2 affect the second coil 3, the second outer magnetic pole portions 9A through 9E, and the second inner magnetic pole portion 10B via the output shaft 10 formed of a soft magnetic material, and the magnetic flux lines generated by energization of the second coil 3 affect the first coil 2, the first outer magnetic pole portions 8A through 8E, and the first inner magnetic pole portion 10A via the output shaft 10 formed of a soft magnetic material, resulting in unstable motor rotation.

While in the above embodiments the output shaft fixed to the inner periphery of the magnet ring is opposed to both the first and second outer magnetic pole portions within a predetermined axial range, there being formed an inner magnetic pole portion excited by the first coil and the second coil, this should not be construed restrictively. It is also possible for the output shaft to be opposed to at least one of the first and second outer magnetic pole portions within a predetermined axial range, there being formed an inner magnetic pole portion to be excited by at least one of the first coil and the second coil.

This application claims priority from Japanese Patent Application No. 2004-118996 filed on Apr. 14, 2004, which is hereby incorporated by reference herein.

What is claimed is:

1. A stepping motor comprising:
a magnet ring whose outer peripheral surface is circumferentially divided to form radial protrusions and recesses and whose outer peripheral surface is made of a cylindrical permanent magnet magnetized to the same polarity;
a first cylindrical coil and a second cylindrical coil that are concentric with the magnet ring and arranged so as to hold the magnet ring therebetween with respect to an axial direction;
a first outer magnetic pole portion opposed to one outer peripheral surface side of the magnet ring with a predetermined distance therebetween and excited by the first coil;
a second outer magnetic pole portion opposed to the other outer peripheral surface side of the magnet ring with a predetermined distance therebetween and excited by the second coil; and
an output shaft formed of a soft magnetic material and fixed to an inner peripheral portion of the magnet ring, the output shaft being opposed to at least one of the first outer magnetic pole portion and the second outer magnetic pole portion in a predetermined axial range and equipped with an inner magnetic pole portion excited by at least one of the first coil and the second coil,
wherein the magnet ring is formed of a sheet-like flexible material whose one side has protrusions and recesses, and is wound around and fixed to an outer peripheral surface of the inner magnetic pole portion formed on the output shaft such that the outer peripheral surface has protrusions and recesses to form a cylindrical configuration, and wherein winding-start and winding-end portions of the sheet-like flexible material with respect to the outer peripheral surface of the inner magnetic pole portion are recessed portions.

2. A stepping motor comprising:
a magnet ring whose outer peripheral surface is circumferentially divided to form radial protrusions and recesses and whose outer peripheral surface is made of a cylindrical permanent magnet magnetized to the same polarity;

a first cylindrical coil and a second cylindrical coil that are concentric with the magnet ring and arranged so as to hold the magnet ring therebetween with respect to an axial direction;

a first outer magnetic pole portion that is opposed to one outer peripheral surface extending from one end surface of the magnet ring and is excited by the first coil;

a second outer magnetic pole portion that is opposed to the other outer peripheral surface extending from the other end of the magnet ring and is excited by the second coil; and an output shaft formed of a soft magnetic material, fixed to an inner peripheral portion of the magnet ring, the output shaft being opposed to the first outer magnetic pole portion in a predetermined axial range and opposed to the first inner magnetic pole portion and the second outer magnetic pole portion in a predetermined axial range, the output shaft being equipped with a second inner magnetic pole portion excited by the second coil, wherein a connecting portion with an outer diameter D2 is provided between the first inner magnetic pole portion and the second inner magnetic pole portion with an outer diameter D1 such that D1>D2, and wherein the magnet ring is formed of a sheet-like flexible material whose one side has protrusions and recesses, and is wound around and fixed to an outer peripheral surface of each of the first inner magnetic pole portion and the second inner magnetic pole portion formed on the output shaft such that the outer peripheral surface has protrusions and recesses to form a cylindrical configuration, winding-start and winding-end portions of the sheet-like flexible material with respect to the outer peripheral surface of each of the first inner magnetic pole portion and the second inner magnetic portion are recessed portions.

3. A stepping motor comprising:

an output shaft having a cylindrical portion and formed of a soft magnetic material;

a permanent magnet formed of a sheet-like flexible material wound around the cylindrical portion of the output shaft and divided in a circumferential direction of the cylindrical portion and alternately magnetized to different polarities;

a first cylindrical coil and a second cylindrical coil that are concentric with the cylindrical portion of the output shaft and arranged so as to axially hold therebetween the cylindrical portion around which the sheet-like permanent magnet is wound;

a first outer magnetic pole portion opposed to one outer peripheral surface side of the sheet-like permanent magnet wound around an outer peripheral portion of the cylindrical portion of the output shaft with a predetermined distance therebetween and excited by the first coil; and a second outer magnetic pole portion opposed to the other outer peripheral surface side of the sheet-like permanent magnet wound around the outer peripheral portion of the cylindrical portion of the output shaft with a predetermined distance therebetween and excited by the second coil, wherein the cylindrical portion of the output shaft is opposed to at least one of the first outer magnetic pole portion and the second magnetic pole portion in a predetermined axial range, and excited by at least one of the first coil and the second coil.

* * * * *

UNITED STATES PATENT AND TRADEMARK OFFICE
CERTIFICATE OF CORRECTION

PATENT NO. : 7,173,352 B2
APPLICATION NO. : 11/080416
DATED : February 6, 2007
INVENTOR(S) : Chikara Aoshima It is certified that error appears in the above-identified patent and that said Letters Patent is hereby corrected as shown below:

COLUMN 2:

Line 64, "moor" should read --motor--.

COLUMN 13:

Line 2, "are magnetized" should read --is magnetized--.

Signed and Sealed this

Twenty-ninth Day of July, 2008

JON W. DUDAS
*Director of the United States Patent and Trademark Office*